(No Model.)

L. W. & W. H. HEMP.
MINNOW BUCKET.

No. 523,470. Patented July 24, 1894.

Witnesses:
W. J. Sankey.
F. Bunyan.

Inventors: Lewis W. Hemp
William H. Hemp
by Higdon Higdon Longan
Atty's

THE NORRIS PETERS CO., PHOTO-LITHO., WASHINGTON, D. C.

UNITED STATES PATENT OFFICE.

LEWIS W. HEMP AND WILLIAM H. HEMP, OF ST. LOUIS, MISSOURI.

MINNOW-BUCKET.

SPECIFICATION forming part of Letters Patent No. 523,470, dated July 24, 1894.

Application filed December 21, 1893. Serial No. 494,249. (No model.)

*To all whom it may concern:*

Be it known that we, LEWIS W. HEMP and WILLIAM H. HEMP, citizens of the United States, and residents of St. Louis, Missouri, have invented certain new and useful Improvements in Floating Minnow-Buckets, of which the following is a full, clear, and exact description, reference being had to the accompanying drawings, forming a part hereof.

Our invention relates to a floating minnow bucket, and it consists in the novel construction, combination and arrangement of parts hereinafter described and designated in the claims, and illustrated in the accompanying drawings.

Figure 1:
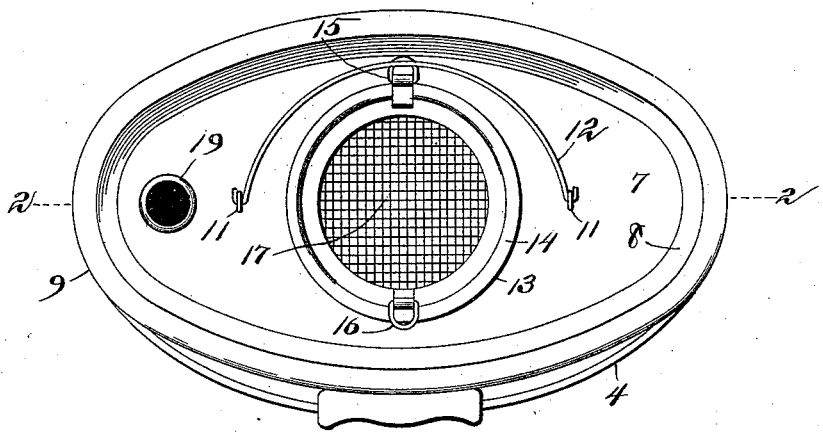
Figure 2:
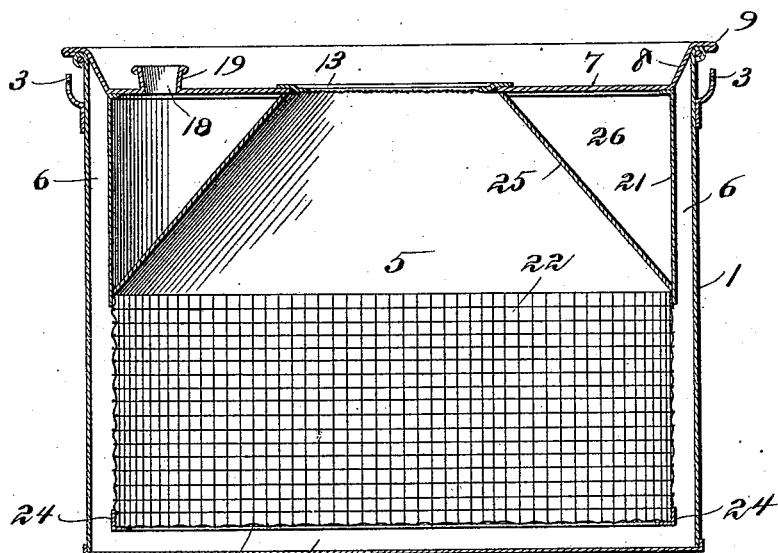

In the drawings: Figure 1 is a plan view of our complete minnow bucket. Fig. 2 is a vertical longitudinal central section of our improved minnow bucket, said section being taken on the line 2—2 of Fig. 1.

1 indicates the main body of the bucket, and is round or elliptical in plan view. Said body is provided with a suitable bottom 2 and ears 3 are connected to the sides of the body adjacent the upper end, so that a suitable bail 4 can be connected for convenience in carrying the minnow bucket.

5 indicates the detachable minnow receptacle, which is the same shape in plan view as the body 1, but is a suitable amount smaller so as to form an annular space 6 between the sides of said receptacle and the adjacent sides of the body.

The cover 7 of the minnow receptacle is provided with an upwardly projecting marginal flange 8, upon the upper edge of which is a flange 9 so constructed that when the minnow receptacle is placed within the body 1, said flange 9 will engage the upper end of said body and retain the minnow receptacle in the required position, it being a suitable amount shorter than the body 1 so that a space 10 will be formed between the lower end of said receptacle and the bottom 2 of the body.

Connected to the upper side of the cover 7 are two ears 11, to which is connected a bail 12 for convenience in handling the minnow receptacle when it is detached from the body 1.

Formed in the center of the cover 7 of the minnow receptacle 5 is an opening which is covered by a hinged cover 13. This cover is formed of an annular frame 14, which is hinged by means of a hinge 15 to the cover 7. The cover 13 is also provided with a ring 16 to be engaged by the finger for raising said cover when it is desired to gain admittance to the receptacle 5. The space within the annular frame 14 of the cover 13 is covered with reticulated material 17.

18 indicates an opening formed in the cover 7 of the receptacle 5, adjacent the inner end thereof, and a neck 19 is located on said cover over said opening. This neck 19 is constructed to be engaged by a cork or plug.

The body of the minnow receptacle 5 is constructed of a piece of tin, or like material, 21 bent elliptical in plan view and of such a size that one end can be brazed or soldered to the under side of the cover 7 of said receptacle. This piece of metal 21 extends downward from the cover 7 about half the length of said receptacle.

The lower portion of the minnow receptacle 5 is constructed of reticulated material 22, and the upper end is connected to the lower end of the portion 21 of said receptacle. The reticulated portion 22 of said receptacle is provided with a bottom 23 made of the same material. Said bottom is connected to that portion 22 of the receptacle 5 by an annular strengthening strip 24 connected to each of said portions by solder, or the like.

25 indicates a flaring partition, the upper end of which is connected to the under side of the cover 7 of the receptacle 5 adjacent the opening in the center of said cover and extending around said opening. The lower end of said partition is connected to the lower end of that portion 21 of the receptacle by solder or other means for making a water tight joint. By the construction of this partition, a chamber 26 is formed in said receptacle 5 adjacent its upper end. (See Fig. 2 for illustration.)

The operation is as follows: When it is desired to place minnows within the bucket, the operator first places a suitable amount of water in the body 1, which will pass into the minnow receptacle 5 through the reticulated portion of said receptacle. To place minnows within the receptacle, the operator raises the cover 13, which will give free access to said receptacle for placing minnows therein. When it is desired to transfer the minnows and bucket a long distance on a hot day, a piece of ice of suitable size is placed upon the cover 7 of the minnow receptacle and the annular flange 8 prevents said ice from slipping off, and the ice will keep the minnows cool and prevent them from suffering from heat, as otherwise would be the case. When it is desired to remove a minnow from the receptacle, the operator raises the cover 13 and reaches into the receptacle and grasps a minnow with the hand and draws the minnow up the side of the flaring partition to the upper edge of said partition, when the minnow can be grasped by both hands.

A person familiar with handling minnows will readily see the advantage of the upper end of the flaring partition being flush with the opening in the cover of the receptacle, as a minnow can be drawn up the side of said partition and out through the opening in the cover of the receptacle without hurting the minnow.

By placing a cork in the neck 19 of the cover 7 it makes the chamber 26 water tight.

By filling the chamber 26 with water the minnow receptacle will sink, thus keeping the minnows at the bottom of the pond or river, which is very convenient in warm weather as it keeps the minnows in cool water.

What we claim is—

1. A minnow bucket comprising an outer casing, a reticulated lower portion and a normally air-tight upper portion, said upper portion being provided with a valve whereby the air may be released therefrom as required to sink the bucket.

2. A floating minnow bucket, comprising a body, a minnow receptacle located in said body, said minnow receptacle having a downwardly flaring partition, the edges of which merge into the sides and top, respectively, of said receptacle and having an opening in its upper end adapted to be closed by a lid constructed of reticulated material, a partition located on the inside of minnow receptacle having its upper end secured to the upper end of said receptacle and flush with the opening formed therein and its lower end secured to the inside of said minnow receptacle and obliquely thereto, substantially as set forth.

In testimony whereof we affix our signatures in presence of two witnesses.

LEWIS W. HEMP.
WILLIAM H. HEMP.

Witnesses:
T. T. BUNYAN,
JNO. C. HIGDON.